(12) United States Patent
Uchida

(10) Patent No.: US 10,901,474 B2
(45) Date of Patent: Jan. 26, 2021

(54) SYSTEM, ELECTRONIC DEVICE, AND CHARGE CONTROLLING METHOD

(71) Applicant: TOSHIBA CLIENT SOLUTIONS CO., LTD., Tokyo (JP)

(72) Inventor: Katsuhiro Uchida, Ome Tokyo (JP)

(73) Assignee: Toshiba Client Solutions CO., LTD., Tokyo (JP)

( * ) Notice: Subject to any disclaimer, the term of this patent is extended or adjusted under 35 U.S.C. 154(b) by 74 days.

(21) Appl. No.: 16/207,872

(22) Filed: Dec. 3, 2018

(65) Prior Publication Data
US 2019/0286202 A1   Sep. 19, 2019

(30) Foreign Application Priority Data

Mar. 14, 2018   (JP) .................................. 2018-046918

(51) Int. Cl.
| | | |
|---|---|---|
| *H02J 7/00* | (2006.01) | |
| *G06F 1/26* | (2006.01) | |
| *G06F 1/3287* | (2019.01) | |
| *H02M 1/10* | (2006.01) | |
| *H02J 7/02* | (2016.01) | |
| *G06F 1/3296* | (2019.01) | |

(52) U.S. Cl.
CPC ............ *G06F 1/263* (2013.01); *G06F 1/3287* (2013.01); *G06F 1/3296* (2013.01); *H02J 7/00* (2013.01); *H02J 7/02* (2013.01); *H02M 1/10* (2013.01)

(58) Field of Classification Search
None
See application file for complete search history.

(56) References Cited

U.S. PATENT DOCUMENTS

| | | | | |
|---|---|---|---|---|
| 7,508,161 | B2* | 3/2009 | Harada .................. | B41J 29/393 320/103 |
| 8,816,643 | B2* | 8/2014 | Saeki ................. | H04N 5/23241 320/138 |
| 9,652,351 | B2* | 5/2017 | Srivastava .......... | G06F 13/4295 |
| 10,423,566 | B2* | 9/2019 | Lee ..................... | G06F 13/4295 |
| 10,521,372 | B2* | 12/2019 | Lee ..................... | G06F 13/4282 |
| 2017/0063105 | A1* | 3/2017 | Chu ....................... | H02J 7/007 |
| 2017/0126041 | A1 | 5/2017 | Sato | |
| 2017/0336844 | A1 | 11/2017 | Koga | |
| 2018/0131196 | A1* | 5/2018 | Gong .................. | H02J 7/00041 |

(Continued)

FOREIGN PATENT DOCUMENTS

| | | |
|---|---|---|
| WO | WO 2016/013451 A1 | 1/2016 |
| WO | WO 2016/121434 A1 | 8/2016 |

*Primary Examiner* — Leigh M Garbowski
(74) *Attorney, Agent, or Firm* — Knobbe, Martens, Olson & Bear, LLP

(57) ABSTRACT

According to one embodiment, a system includes a first device and a second device. The first device serves as an electric power supplying side. The second device serves as an electric power receiving side. The first device includes a transmitter that transmits status information to the second device. The status information indicates a state of an electric power source of the first device. The second device includes a receiver and a controller. The receiver receives the status information from the first device. The controller controls charging of a battery included in the second device using an electric power supplied from the first device, based on the state of the electric power source of the first device indicated by the status information.

20 Claims, 5 Drawing Sheets

(56) References Cited

U.S. PATENT DOCUMENTS

| | | | |
|---|---|---|---|
| 2019/0131810 A1* | 5/2019 | Lim | H02J 7/342 |
| 2019/0250689 A1* | 8/2019 | Ivanov | G06F 3/04847 |
| 2019/0294228 A1* | 9/2019 | Tamura | G06F 1/266 |
| 2019/0341786 A1* | 11/2019 | Lee | G06F 1/3275 |

\* cited by examiner

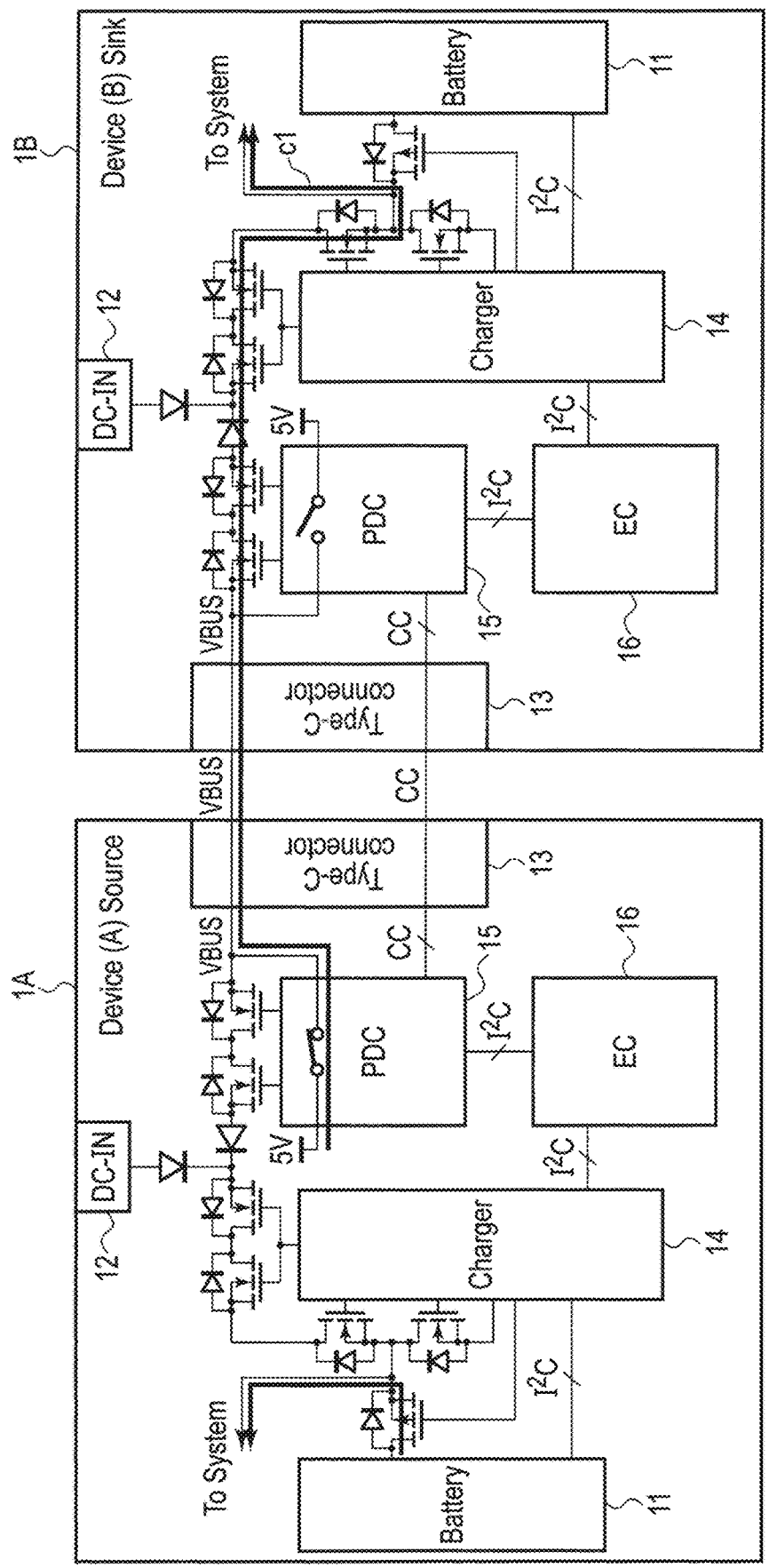
F I G. 1

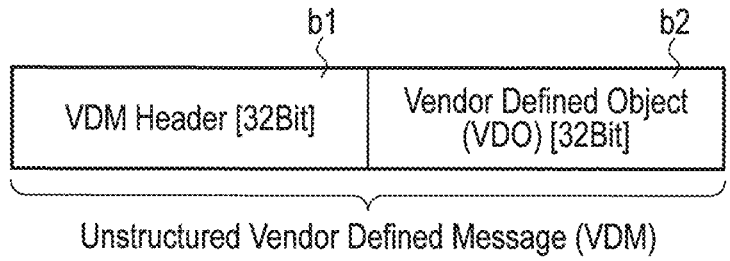

FIG. 4

| Bit(s) | Parameter | Description |
|---|---|---|
| 31-16 | Vendor ID (VID) | Depend on the vendor |
| 15 | VDM Type | 0=Unstructured VDM |
| 14-0 | Vender Use | Content of this field is defined by the vendor. |

(A) VDM Header

| Bit(s) | Parameter | Description |
|---|---|---|
| 31-16 | Product ID (PID) | Depend on the model |
| 15 | AC drive/battery drive | 1=AC drive<br>0=battery drive |
| 14 | Permission/inhibition of charging | 1=charging permitted<br>0=charging inhibited |
| 13-6 | Battery charging rate | 0%~100% |
| 5-0 | Reserved | |

(B) VDO Example

FIG. 5

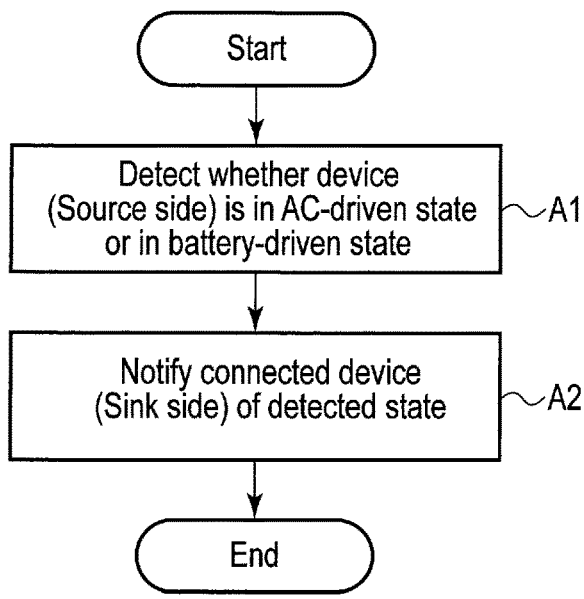
F I G. 6
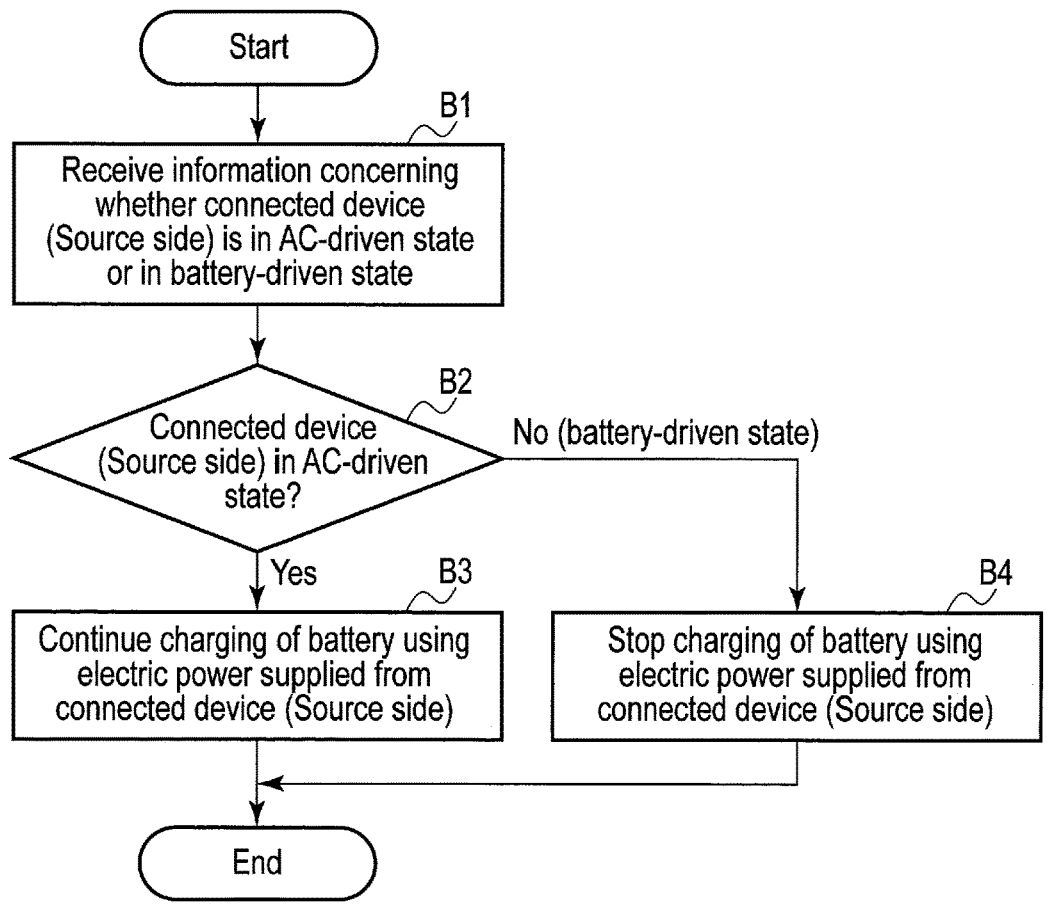
F I G. 7

SYSTEM, ELECTRONIC DEVICE, AND CHARGE CONTROLLING METHOD

CROSS-REFERENCE TO RELATED APPLICATIONS

This application is based upon and claims the benefit of priority from Japanese Patent Application No. 2018-046918, filed Mar. 14, 2018, the entire contents of which are incorporated herein by reference.

FIELD

Embodiments described herein relate generally to a system, an electronic device, and a charge controlling method.

BACKGROUND

In recent years, various electronic devices such as a notebook personal computer (PC), a tablet PC, a smartphone, and the like are widely spread. This kind of electronic device is generally provided with an interface function used to transmit/receive data to/from an external device. As one of interface standards, the Universal Serial Bus (USB) standard is known. In an interface conforming to the USB standard, electric power transmission is enabled in addition to data transfer.

When electronic devices each supporting Dual Role Power (DRP) of USB Type-C Power Delivery are connected to each other, there is a possibility of each of the electronic devices becoming a Source or becoming a Sink depending of the timing. The Source implies an electronic device (Source device) serving as the electric power supplying side, and the Sink implies an electronic device (Sink device) serving as the electric power receiving side.

Here, a case where electronic devices each supporting DRP of USB Type-C Power Delivery for the purpose of data transfer and in a battery-driven state are to be connected to each other, is assumed. Regarding delivery/reception of electric power between the electronic devices in such a case, battery power is only increased or decreased on each side of the electronic devices, and hence the delivery/reception of electric power between the electric devices is useless in many cases.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view showing an example of the configuration concerning an electric power source of a system of an embodiment.

FIG. 4 is an exemplary view showing the configuration of data transmitted/received in the unstructured VDM communication.

FIG. 5 is an exemplary view showing examples of parameters transferred in the unstructured VDM communication in the system of the embodiment.

FIG. 6 is an exemplary flowchart showing an operating procedure of the Source device (device (A)) of the system of the embodiment.

FIG. 7 is an exemplary flowchart showing an operating procedure of the Sink device (device (B)) of the system of the embodiment.

DETAILED DESCRIPTION

Figure 2:
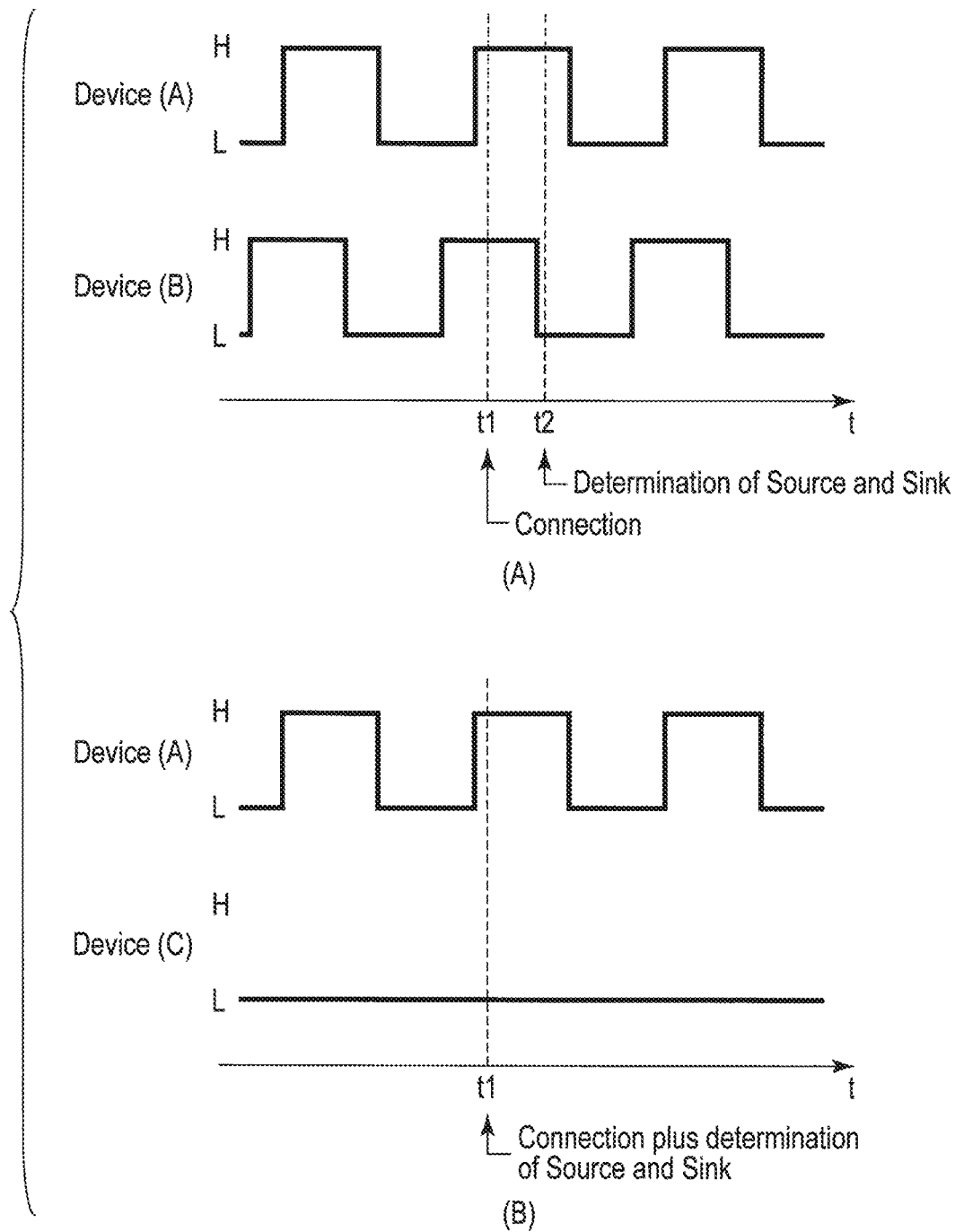
FIG. 2 is an exemplary view for explaining an outline of a decision rule of a Source and a Sink.

In general, according to one embodiment, a system includes a first device and a second device. The first device serves as an electric power supplying side. The second device serves as an electric power receiving side. The first device and the second device are connected through a cable enabling data transfer and electric power transmission. The first device includes a transmitter that transmits status information to the second device through the cable. The status information indicates a state of an electric power source of the first device. The second device includes a receiver and a controller. The receiver receives the status information from the first device through the cable. The controller controls charging of a battery included in the second device using an electric power supplied from the first device through the cable, based on the state of the electric power source of the first device indicated by the status information received by the receiver.

Hereinafter, an embodiment will be described below with reference to the accompanying drawings.

FIG. 1 is an exemplary view showing an example of the configuration concerning an electric power source of a system of this embodiment.

The system of this embodiment is a system constituted of two electronic devices (device (A) 1A [first device] and device (B) 1B [second device]) each supporting DRP of USB Type-C Power Delivery. Here, it is assumed that both the device (A) 1A and the device (B) 1B have configurations identical to each other with respect to the electric power source. More specifically, each of the device (A) 1A and the device (B) 1B has, as a configuration concerning the electric power source, a battery 11, a DC-IN jack 12, a USB Type-C connector 13, a charger 14, a USB Type-C Power Delivery Controller (PDC) 15, and an Embedded Controller (EC) 16.

The PDC 15 and the EC 16 can communicate with each other through an $I^2C$ bus. For example, whether the device becomes the Source or the Sink is determined by the PDC 15, and is notified to the EC 16 by communication through the $I^2C$ bus. Further, the PDC 15 is controlled by the EC 16 through the $I^2C$ bus, and executes communication between itself and the PDC 15 which is the connection destination under the control of the EC 16.

The EC 16 can communicate also with the charger 14 through the $I^2C$ bus. Also the charger 14 is controlled by the EC 16 through the $I^2C$ bus, and controls charge/discharge of the battery 11 under the control of the EC 16. Further, the charger 14 can detect presence/absence of connection of an AC adapter to the DC-IN jack 12, and notifies the EC 16 of the detection result by communication through the $I^2C$ bus.

Further, the charger 14 can communicate also with the battery 11 through the $I^2C$ bus. By the communication through the $I^2C$ bus, the charger 14 can acquire information about the charging rate of the battery 11. The information about the charging rate of the battery 11 acquired by the charger 14 is notified to the EC 16 by the communication through the $I^2C$ bus.

That is, electric-power control in each of the device (A) 1A and the device (B) 1B is executed by the EC 16. More specifically, the EC 16 executes electric power control including charge/discharge of the battery 11 according to whether its own device is the Source or the Sink which is information notified thereto by the PDC 15, whether or not a connection of the AC adapter is made which is information notified thereto by the charger 14, and the like.

As described previously, each of the device (A) 1A and the device (B) 1B is an electronic device in which the battery 11 is included. Further, in each of the device (A) 1A and the device (B) 1B, external electric power can be input thereto from the DC-IN jack 12 or USB Type-C connector 13. To the DC-IN jack 12, a conventional AC adapter can be connected. On the other hand, the USB Type-C connector 13 supports the Power Delivery function and, when a Source device compatible with Power Delivery such as the AC adapter is connected thereto, the PDC 15 makes its own device operate as a Sink, and receives the supply of electric power from the AC adapter through the VBUS, whereby the PDC 15 can carry out charging of the battery 11 of its own device. Further, when a Sink device compatible with Power Delivery such as a USB hub and a peripheral device is connected to the USB Type-C connector 13, the PDC 15 makes its own device operate as a Source, and can supply electric power to the Sink device through the VBUS. That is, the device (A) LA and the device (B) 1B are DRP-supporting devices that can serve as the Source or as the Sink. Supposing that DRP-supporting devices are connected to each other, each of the devices becomes the Source or the Sink depending on the timing in some cases.

Here, an outline of the rule by which the Source and the Sink are determined will be described below with reference to FIG. 2.

A DRP-supporting device repeats pull-up (H) and pull-down (L) of the CC line at regular intervals. As shown in (A) of FIG. 2, after a connection (t1), at timing (t2) at which a state where pull-up (H) is carried out in one of the devices, and pull-down (L) is carried out in the other of the devices occurs, the pull-up (H) side device is determined as the Source, and the pull-down (L) side device is determined as the Sink. As shown in (A) of FIG. 2, although at the timing of connection (t1), there has been a situation in which both the device (A) 1A and the device (B) 1B are in the pull-up (H) state, the device (B) 1B has earlier made a transition to the pull-down (L) state, and hence the device (A) 1A has been determined as the Source, and device (B) 1B has been determined as the Sink.

Further, as shown in (B) of FIG. 2, it is also possible to intentionally serve as the Sink by maintaining the pull-down (L) state. As shown in (B) of FIG. 2, the device (C) keeps itself in the pull-down (L) state, and hence simultaneously with the connection (t1), the device (A) 1A has been determined as the Source, and the device (B) 1B has been determined as the Sink. It should be noted that after determination of the Source and the Sink, it is also possible to interchange the roles by communication using the CC line. As described previously, determination of the Source and the Sink is carried out by the PDC 15, and a result thereof is notified to the EC 16.

The description will be returned to FIG. 1 to be continued.

Each of the device (A) 1A and the device (B) 1B has USB communication capability, i.e., data transfer function in addition to the Power Delivery function. Each of these devices mainly functions as a USB host, i.e., as a Downstream Facing Port (DFP), and carry out data transfer with a USB device, i.e., USB hub serving as an Upstream Facing Port (UFP) or a peripheral device. Further, each of these devices functions also as a UFP, and can also carry out data transfer with some other DFP device. Alternatively, after carrying out Vendor Defined Message (VDM) communication, these devices may possibly carry out data transfer between them by using a prescribed data transfer function. Accordingly, the device (A) 1A and the device (B) 1B are Dual Role Data (DRD) having both the functions of the DFP and UFP. This also corresponds to the condition that the Data Role should be DRD when the Power Role is DRP concerning the USB Power Delivery Specification (hereinafter referred to as the PD spec).

Accordingly, the device (A) 1A and the device (B) 1B can carry out data transfer between them by connecting them to each other through the USB Type-C connectors. At this time, when the AC adapter is connected to the DC-IN jack 12 of the device (A) 1A, the device (A) 1A serves as the Source to supply electric power to the battery-driven device (B) 1B serving as the Sink, whereby the device (B) 1B can charge the battery 11 of its own device. On the other hand, even when the AC adapters are not yet connected to both the device (A) 1A and the device (B) 1B, and both the devices are in the battery-driven state, the device (A) 1A serving as the Source is required to supply electric power to the device (B) 1B serving as the Sink and, at that time, there occurs apprehension that battery drain of the device (A) 1A becomes intense.

In order to dispel this apprehension, in the system of this embodiment, the device (A) 1A serving as the Source causes the device (B) 1B serving as the Sink to recognize whether the device (A) 1A is in the AC-driven state or in the battery-driven state or, alternatively, notifies the device (B) 1B of whether or not the device (A) 1A is in a state adequate for charging of the battery 11 of the device (B) 1B.

Figure 3:
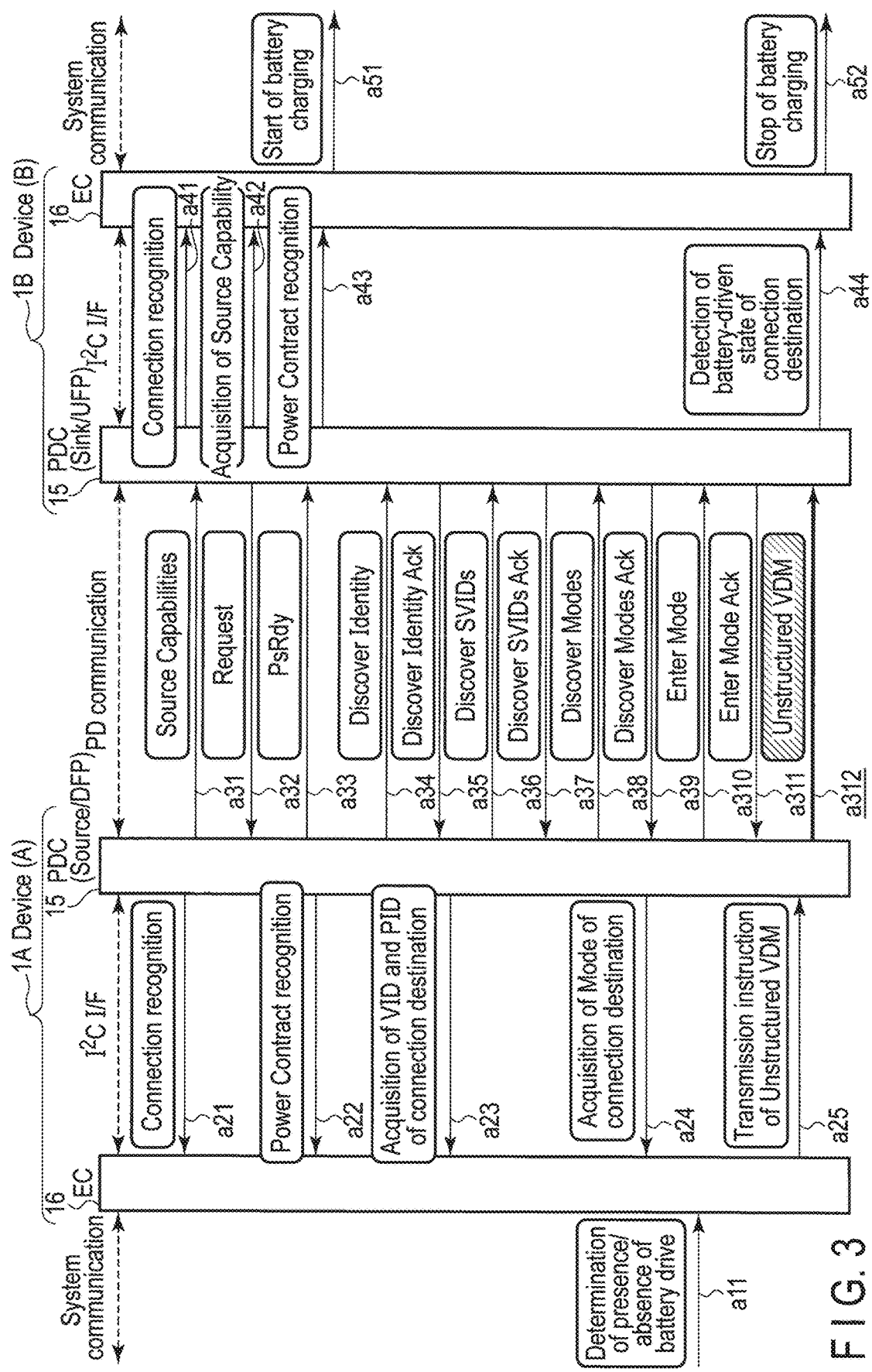
FIG. 3 is an exemplary view showing an example of a sequence of communication between a device (A) 1A and a device (B) 1B in the system of the embodiment.

Here, a sequence of a case where the device (A) 1A and the device (B) 1B both of which are in the battery-driven state are connected to each other and, the device (A) 1A serves as the Source will be described below with reference to FIG. 3.

When the device (A) 1A and the device (B) 1B are connected to each other, first, both the PDCs 15 of the device (A) 1A and the device (B) 1B recognize that some connection has occurred on the basis of a change in the common voltage of the CC line of the USB Type-C connector 13 (a21 and a41). At this time, the Power Role of each of the device (A) 1A and the device (B) 1B makes a transition from DRP to the Source or the Sink. Here, it is assumed that the Power Role of the device (A) 1A makes a transition from DRP to the Source, and Power Role of the device (B) 1B makes a transition from DRP to the Sink. Further, regarding each Data Role, the device (A) 1A becomes the DFP and the device (B) 1B becomes the UFP in accordance with the PD spec.

Then, negotiation of Power is carried out (a31 to a33), the device (B) 1B acquires Source Capabilities of the device (A) 1A (a42), selects a voltage/current most appropriate for its own device, and makes a request of the device (A) 1A to deliver the selected voltage/current thereto, whereby the Power Contract is completed (a22 and a43). At this time, the device (B) 1B starts charging of the battery 11 of its own device (a51).

Next, the device (A) 1A which has become the Source/DFP carries out VDM communication in order to carry out delivery/reception of information specified by the PD spec to/from the connection destination, i.e., the device (B) 1B (a34 to a311). More specifically, the device (A) 1A acquires the Vendor ID (VID) and Product ID (PID) of the device (B) 1B (a23) in the Discover Identity communication of the VDM (a34 to a37). Thereby, the device (A) 1A can grasp the name of the manufacturer of the device (B) 1B. Furthermore, when both the device (A) 1A and device (B) 1B have the name of the identical manufacture, the model of the device (B) 1B can be grasped from the PID. Further, the device (A) 1A recognizes, in the Discover Modes communication (a38 to a39), whether or not the device (B) 1B has a data transfer mode specified by some communication other than the USB communication (a24) and, when carrying out communication in that data transfer mode, carries out the Enter Mode communication (a310 to a311). It should be noted that in the meantime, in the device (A) 1A, presence/absence of connection of the AC adapter to the DC-IN jack 12 is detected by the charger 14, and presence/absence of battery drive of its own device is notified to the EC 16 (all).

Next, the device (A) 1A carries out the Unstructured VDM communication unique to the system of this embodiment (a25 and a312). Regarding the Unstructured VDM communication, unlike the aforementioned VDM communication (called the Structured VDM communication), all the parameters to be transferred are not specified by the PD spec, and are dependent on the Vendor. What are specified are only the VID in the VDM Header and a Bit indicating the Unstructured VDM or Structured VDM.

In FIG. 4, the configuration of data transmitted/received in the Unstructured VDM communication is shown and, in FIG. 5, examples of parameters transferred in the Unstructured VDM communication in the system of this embodiment are shown.

As shown in FIG. 4, the data transmitted/received in the Unstructured VDM communication is constituted of 64 bits including a 32-bit VDM Header and 32-bit Vendor Defined Object (VDO). As shown in (A) of FIG. 5, in the bits 31 to 16 of the VDM Header, the VID is stored. Further, in the case of the Unstructured VDM, in the bit 15 of the VDM Header, 0 is stored.

Further, as shown in (B) of FIG. 5, in the system of this embodiment, data indicating whether the device (A) 1A is now in the AC-driven state or in the battery-driven state is stored in the bit 15 of the VDO. That is, the device (A) 1A notifies the connection destination device (B) 1B of whether its own device is in the AC-driven state or in the battery-driven state as status information by the Unstructured VDM communication (a25 and a312).

By receiving the status information, the device (B) 1B can detect whether the device (A) 1A is in the AC-driven state or in the battery-driven state (a44). When the device (A) 1A is in the AC-driven state, the device (B) 1B uses the VBUS electric power of the device (A) 1A for charging of the battery 11 of its own device and as the system power source of its own device. On the other hand, when the device (A) 1A is in the battery-driven state, the device (B) 1B does not use the VBUS electric power of the device (A) 1A for charging of the battery 11 of its own device (a52). That is, the device (B) 1B stops charging of the battery 11 of its own device using the VBUS electric power of the device (A) 1A. In FIG. 1, the latter state, i.e., the state where the VBUS electric power of the device (A) 1A is used only as the system power source of the device (B) 1B, and is not used for charging of the battery 11 of the device (B) 1B, is shown (c1). It should be noted that in FIG. 1, although the state where the VBUS electric power of the device (A) 1A is used as the system power source of the device (B) 1B is shown, furthermore, the VBUS electric power of the device (A) 1A may not be used as the system power source of the device (B) 1B in addition to not using the VBUS electric power of the device (A) 1A for charging of the battery 11 of the device (B) 1B.

As described above, in the system of this embodiment, the PDC 15 functions as a transmitter or a receiver of status information concerning the electric power source under the control of the EC 16, and EC 16 functions as a controller configured to control continuation/stoppage of charging of the battery 11 using the electric power supplied from the connection destination based on the status information.

FIG. 6 is an exemplary flowchart showing an operating procedure of the Source device (device (A) 1A) of the system of this embodiment.

The device (A) 1A first detects whether its own device is in the AC-driven state or in the battery-driven state (step A1). This detection is carried out by the charger 14. The device (A) 1A notifies the device (B) 1B of the detected state by the Unstructured VDM communication (step A2). This notification is carried out by the PDC 15 through the USB Type-C connectors 13 under the control of the EC 16.

FIG. 7 is an exemplary flowchart showing an operating procedure of the Sink device (device (B) 1B) of the system of this embodiment.

The device (B) 1B first receives information concerning whether the connected device, i.e., the device (A) 1A is in the AC-driven state or in the battery-driven state from the device (A) 1A by the Unstructured VDM communication (step B1). This reception is carried out by the PDC 15 through the USB Type-C connectors 13. This information is transmitted from the PDC 15 to the EC 16. It should be noted that at this time, the device (B) 1B has already started charging of the battery 11 of its own device using the electric power supplied from the device (A) 1A.

When the device (A) 1A is in the AC-driven state (YES of step B2), the device (B) 1B continues charging of the battery 11 of its own device using the electric power supplied from the device (A) 1A (step B3). When the device (A) 1A is in the battery-driven state (NO of step B2), the device (B) 1B stops charging of the battery 11 of its own device using the electric power supplied from the device (A) 1A (step B4). Continuation/stoppage of the charging is controlled by the EC 16.

As described above, in the system of this embodiment, it is possible to adaptively control delivery/reception of electric power between electronic devices.

Incidentally, as described previously, in the Unstructured VDM communication, various parameters can be stored in the VDO. Thus, as shown in (B) of FIG. 5, furthermore, for example, the PID may be transferred (bits 31 to 16). The device (A) 1A stores the PID of its own device in the VDO, whereby the device (B) 1B can recognize the model of the device (A) 1A. Accordingly, it becomes possible for the device (B) 1B to execute more minute electric power control taking the model into consideration. It should be noted that by the Unstructured VDM communication, also the device (A) 1A can recognize the model of the device (B) 1B.

Furthermore, when transmitting the Unstructured VDM to the device (B) 1B, the device (A) 1A can also put data permitting/not permitting (inhibition) the connection destination to charge the battery thereof in the Unstructured VDM even when its own device is in the battery-driven state according to the charging rate of the battery thereof instead of putting data indicating whether its own device is in the AC-driven state or in the battery-driven state in the Unstructured VDM (bit 14). Further, the device (A) 1A can also change the charging rate of the battery 11 constituting the boundary condition according to the model of the connection destination. When the connection destination is a small device of the low electric power type, it is possible for the device (A) 1A to lower the charging rate boundary condition of the battery 11 of its own device. When the connection destination is a large device of the high electric power type, it is also possible for the device (A) 1A to raise the charging rate boundary condition of the battery 11 of its own device or make whether its own device is in the AC-driven state or in the battery-driven state the boundary condition.

Furthermore, the device (A) 1A stores information concerning the charging rate of the battery 11 of its own device in the Unstructured VDM and notifies the device (B) 1B of the information (bits 13 to 6) to thereby be able to let the device (B) 1B know the charging status of the device (A) 1A serving as the Source. The device (B) 1B which has received this notification may carry out control in such a manner as to continue, for example, even when the device (A) 1A is in the battery-driven state, if the charging rate exceeds a threshold, charging of the battery 11 of its own device using the electric power supplied from the device (A) 1A and, on the other hand, if the charging rate is below the threshold, stop charging of the battery 11 of its own device using the electric power supplied from the device (A) 1A.

Further, for example, when a change in status, i.e., a change from/to the AC-driven state to/from the battery-driven state occurs in the device (A) 1A or when the charging rate of the battery 11 lowers by more than a fixed value at the time of battery drive, it is desirable that the device (A) 1A should retransmit the Unstructured VDM to the device (B) 1B to thereby let the device (B) 1B know that there is a possibility of the propriety of charging of the battery 11 in the device (B) 1B having changed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising:
    a first device serving as an electric power supplying side; and
    a second device serving as an electric power receiving side, wherein
        the first device and the second device are connected through a cable enabling data transfer and electric power transmission,
        the first device comprises a transmitter that transmits status information to the second device through the cable, the status information indicating a state of an electric power source of the first device, and
        the second device comprises
            a receiver that receives the status information from the first device through the cable, and
            a controller that controls charging of a battery included in the second device using an electric power supplied from the first device through the cable, based on the state of the electric power source of the first device indicated by the status information received by the receiver.

2. The system of claim 1, wherein
    the transmitter of the first device transmits the status information indicating whether the first device is in a state where the first device is driven by an external power source or in a state where the first device is driven by a battery included in the first device, and
    the controller of the second device stops charging of the battery included in the second device using the electric power supplied from the first device through the cable when the first device is in the state where the first device is driven by the battery included in the first device.

3. The system of claim 1, wherein
    the transmitter of the first device transmits the status information indicating whether the first device is in a state where the first device is driven by an external power source or in a state where the first device is driven by a battery included in the first device, and a charging rate of the battery included in the first device, and
    the controller of the second device stops charging of the battery included in the second device using the electric power supplied from the first device through the cable when the first device is in the state where the first device is driven by the battery included in the first device and when the charging rate of the battery included in the first device is below a threshold.

4. The system of claim 1, wherein the transmitter of the first device retransmits the status information when the state of the electric power source of the first device is changed.

5. The system of claim 1, wherein the cable comprises a cable conforming to the Universal Serial Bus (USB) Type-C standard.

6. The system of claim 1, wherein the transmitter of the first device stores the status information into a Vendor Defined Object (VDO) of an Unstructured Vendor Defined Message (VDM), and transmits the VDM.

7. An electronic device connected to an external device through a cable enabling data transfer and electric power transmission, and serving as an electric power supplying side, the electronic device comprising:
    a transmitter that transmits status information indicating a state of an electric power source of the electronic device to the external device through the cable.

8. The electronic device of claim 7, wherein the transmitter transmits the status information indicating whether the electronic device is in a state where the electronic device is driven by an external power source or in a state where the electronic device is driven by a battery included in the electronic device.

9. The electronic device of claim 7, wherein the transmitter transmits the status information indicating whether the electronic device is in a state where the electronic device is driven by an external power source or in a state where the electronic device is driven by a battery included in the electronic device, and a charging rate of the battery included in the electronic device.

10. The electronic device of claim 7, wherein the transmitter retransmits the status information when the state of the electric power source of the electronic device is changed.

11. The electronic device of claim 7, wherein the cable comprises a cable conforming to the USB Type-C standard.

12. The electronic device of claim 7, wherein the transmitter stores the status information into a Vendor Defined Object (VDO) of an Unstructured Vendor Defined Message (VDM), and transmits the VDM.

13. An electronic device connected to an external device through a cable enabling data transfer and electric power transmission, and serving as an electric power receiving side, the electronic device comprising:

a receiver that receives status information indicating a state of an electric power source of the external device from the external device through the cable; and a controller that controls charging of a battery included in the electronic device using an electric power supplied from the external device through the cable, based on the state of the electric power source of the external device indicated by the status information received by the receiver.

14. The electronic device of claim 13, wherein the status information indicates whether the external device is in a state where the external device is driven by an external power source or in a state where the external device is driven by a battery included in the external device, and the controller stops charging of the battery included in the electronic device using the electric power supplied from the external device through the cable when the external device is in the state where the external device is driven by the battery included in the external device.

15. The electronic device of claim 13, wherein the status information indicates whether the external device is in a state where the external device is driven by an external power source or in a state where the external device is driven by a battery included in the external device, and a charging rate of the battery included in the external device, and the controller stops charging of the battery included in the electronic device using the electric power supplied from the external device through the cable when the external device is in the state where the external device is driven by the battery included in the external device and when the charging rate of the battery included in the external device is below a threshold.

16. The electronic device of claim 13, wherein the cable comprises a cable conforming to the USB Type-C standard.

17. The electronic device of claim 13, wherein the receiver receives an Unstructured Vendor Defined Message (VDM) in which the status information is stored into a Vendor Defined Object (VDO).

18. A charge controlling method of a system comprising a first device and a second device, the first device serving as an electric power supplying side, the second device serving as an electric power receiving side, the first device and the second device being connected through a cable enabling data transfer and electric power transmission, the charge controlling method comprising:

transmitting, by the first device, status information indicating a state of an electric power source of the first device to the second device through the cable;

receiving, by the second device, the status information from the first device through the cable; and controlling, by the second device, charging of a battery included in the second device using an electric power supplied from the first device through the cable, based on the state of the electric power source of the first device indicated by the status information received.

19. The charge controlling method of claim 18, wherein the transmitting of the first device comprises transmitting the status information indicating whether the first device is in a state where the first device is driven by an external power source or in a state where the first device is driven by a battery included in the first device, and the controlling of the second device comprises stopping charging of the battery included in the second device using the electric power supplied from the first device through the cable when the first device is in the state where the first device is driven by the battery included in the first device.

20. The charge controlling method of claim 18, wherein the transmitting of the first device comprises transmitting the status information indicating whether the first device is in a state where the first device is driven by an external power source or in a state where the first device is driven by a battery included in the first device, and a charging rate of the battery included in the first device, and the controlling of the second device comprises stopping charging of the battery included in the second device using the electric power supplied from the first device through the cable when the first device is in the state where the first device is driven by the battery included in the first device and when the charging rate of the battery included in the first device is below a threshold.

* * * * *